United States Patent [19]
Tsuyama

[11] 4,025,158
[45] May 24, 1977

[54] REFLECTOR

[75] Inventor: Sadaharu Tsuyama, Osaka, Japan

[73] Assignee: Tsuyama Manufacturing Company, Osaka, Japan

[22] Filed: Oct. 22, 1975

[21] Appl. No.: 624,600

[52] U.S. Cl. .................................. 350/99; 350/97; 350/96 C
[51] Int. Cl.$^2$ ......................................... G02B 5/12
[58] Field of Search ................. 40/38; 292/68, 116, 292/119, 70, 137; 350/106, 107, 99, 96, 97; 248/466; 240/342

[56] References Cited

UNITED STATES PATENTS

| | | | |
|---|---|---|---|
| 1,967,745 | 4/1930 | Critchfield | 350/99 |
| 2,361,319 | 12/1942 | Paul | 350/107 |
| 3,887,268 | 6/1975 | Golden et al. | 350/103 |

FOREIGN PATENTS OR APPLICATIONS 460,300   6/1937   United Kingdom ............... 350/106

OTHER PUBLICATIONS

Machine Design, The Fasteners Book, Sept. 29, 1960, section two, Penton Publication, p. 188 and p. 8.

Primary Examiner—Paul A. Sacher
Assistant Examiner—B. W. de los Reyes
Attorney, Agent, or Firm—Seymour Rothstein

[57] ABSTRACT

A reflector for bicycles, motorcycles or the like vehicles, which includes a body having a reflective surface and a rear support housing secured thereto. The rear support housing has a major bore and a minor bore co-axially formed therewith. A bolt extends axially through the two co-axially formed bores. One of the bores, which is non-circular, is adapted to receive a complementary non-circular portion of the bolt. The bolt has a threaded portion extending rearwardly from the rear support housing. The rear support housing includes an annular wall which defines at least a part of the major bore and a cap is secured to the annular wall, for example, by ultrasonic welding, so as to retain the bolt in desired position in the bores.

4 Claims, 4 Drawing Figures

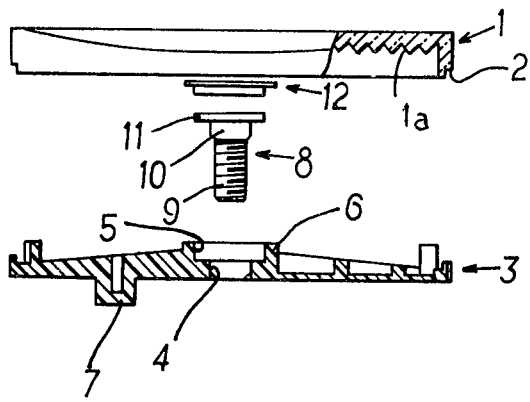
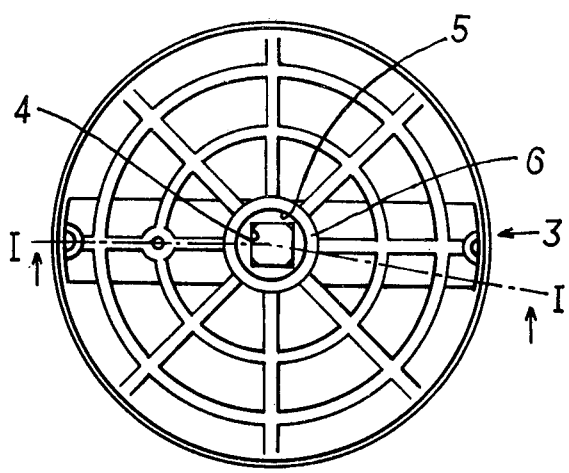
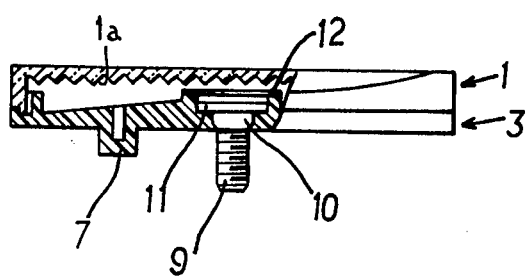
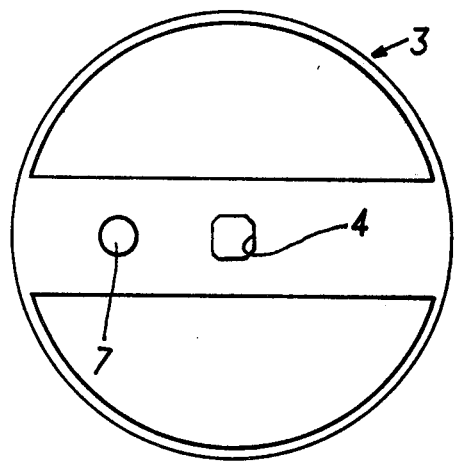

REFLECTOR

BACKGROUND AND SUMMARY OF THE INVENTION

This invention relates to a reflector and, more particularly, to a reflector for a bicycle or like vehicle that has a bolt extended from the rear support housing thereof, in order to facilitate the screw mounting thereof on suitable brackets on the bicycle or like vehicle.

One prior art method for extending a bolt from the rear support of reflectors has depended upon insert forming. In this method, there were difficulties in fixing a position for setting up the bolt relative to the rear support housing so as to permit reliability, uniformity and high production.

An object of this invention is to provide an improved reflector having a bolt extending from the rear support housing in a desirable fixed manner so as to permit reliability, and high production at relatively low cost.

Another object of this invention is to provide an improved reflector for mounting on a vehicle bracket having a pair of openings therein, such reflector having a rear support housing including two co-axially formed aperatures, at least one of which is non-circular and a bolt fixedly retained in said two aperatures by a cap thermally sealed to the rear support housing, a portion of said bolt being non-circular for engaging in the non-circular aperature, the housing having a projection molded thereon, the projection extending into one opening in the vehicle bracket, the bolt being adapted to extend through the other opening in said vehicle bracket to receive a nut to secure the reflector in position on the vehicle bracket. Other objects and advantages of this invention will be made more apparent hereinafter.

BRIEF DESCRIPTION OF THE DRAWING

There is shown in the attached drawing a presently preferred embodiment of the present invention, wherein:

FIG. 1 is an exploded view of a reflector embodying principles of this invention showing in section a rear support housing sectioned generally along line I—I of FIG. 2;

FIG. 2 is a top view of the rear support;

FIG. 3 is an elevation view of the assembled reflector partially assembled; and

FIG. 4 is a bottom view of the rear support housing.

DETAILED DESCRIPTION OF THE PRESENT INVENTION

With reference to the drawing, numeral 1 denotes a reflector body which is made from plastic material, for example, an acrylic resin, and has an internally faceted prismatic reflective surface 1a. The rear marginal portion of reflector body 1 is formed in an annular marginal rim 2. The marginal rim 2 of reflector body 1 is thermally sealed, for example, by ultrasonic welding, to a support housing 3 generally made from plastic, for example, ABS resin.

Support housing 3 is preferably constructed as viewed in FIGS. 1 and 2, and comprises a circular body having a thickened band-like central region extending diametrically on the body and a major axial aperture or bore 5 circular in cross-section and a non-circular minor aperture or bore 4 co-axially formed in the center of said body. Preferably, the bore 4 is square in cross-section. An annular centrally disposed wall 6 defines a part of the major bore 5. Projection 7 is integrally formed on the band-like central region of support housing 3 and extends rearwardly therefrom. The projection 7 functions to prevent rotation of the reflector when it is mounted on a vehicle bracket (not shown) by cooperating with a complementary opening in the bracket to which the reflector is secured. Ribbing may be provided on the thin portions of the body to provide additional strength therefor.

Preferably, the body 1 and the housing 3 are molded to the desired configurations. The marginal rim 2 and the housing 3 are formed with complementary annular surfaces to enhance joining of these components one to the other.

Bolt 8 has a flat head portion 11, a neck portion 10 and an externally threaded screw portion 9. Neck portion 10 is non-circular, for example, square shaped, to render the bolt non-rotatable when accommodated in the complementary square shaped aperture 4 of the support housing 3. It will be understood that bore 5 and head 11 might be non-circular and neck portion 10 and bore 5 might be circular. All that is needed is that one bore and the bolt portion received therein in complementary fashion be non-circular. Numeral 12 is a flanged cap generally made from plastic and preferably, of the same material as support housing 3 (ABS resin) to facilitate connection of the cap to the annular wall 6 of the support housing 3.

In fabrication of the reflector, the bolt 8 is positioned in the co-axial bores 4, 5 with the non-circular neck portion 10 engaged in complementary non-circular bore 4 and the head 11 in bore 5. The flanged cap 12 is inserted into the end of bore 5 above head 11 of bolt 8. Thermal sealing, for example, ultrasonic welding, is applied to the upper surface of cap 12 to effect adhesion between the oppositely contacted or engaged portions of cap 12 and annular wall 6. Flat head 11 and neck portion 10 of bolt 8 are immovable fixedly enclosed in the support housing 3 to fix bolt 8 perpendicularly relative to the support housing 3 with screw portion 9 extending outwardly from the rear of the support housing 3. The reflector body 1 is then thermally bonded to the support housing 3 to complete the reflector.

To mount the reflector on a bracket, the exposed screw portion 9 of bolt 8 is passed through a washer, through a hole of the bracket connected to a bicycle or like vehicle, and then screwed to a nut, so that the reflector can be securely fixed to the bracket. Projection 7 engages in a second hole or opening in the bracket to prevent rotation of the reflector relative to the bracket. In the event a reflector is used that has a reflective surface with an axis that is to be disposed in a particular fashion, for example, vertically for best reflectivity, the bracket openings will be vertically disposed and when the reflector is secured to the bracket, projection 7 will function not only to prevent rotation of the reflector, but also to properly locate the reflector relative to the bracket. Bolt 8 is pulled down into the bore 5 by the screwing operation. A forward force is seldom exerted against bolt 8 acting against cap 12 to break the bond between the cap 12 and annular wall 6 to dislodge the bolt. Only a minor area is necessary for welding cap 12 securely to the annular wall and so the welding operation can be easily and quickly carried out with uniformity and enhanced productivity.

While I have shown and described a presently preferred embodiment of my invention, it will be apparent to those skilled in the art that the invention is capable of modification without departing from the spirit and scope thereof.

I claim:

1. A reflector for bicycles and like vehicles comprising a reflector body having a reflective surface, a rear support housing made from plastic material thermally sealed to said reflector body along a rear marginal rim thereof and having a major bore and a minor bore coaxially formed therein in predetermined axial relationship relative to the rear support housing; a bolt axially extended through said two coaxially formed bores, said bolt having a head, a neck portion and a screw portion, said head of said bolt being seated in said major bore, the neck portion of said bolt being accommodated in said minor bore, and the screw portion of said bolt extending from said housing and a cap having a flange thermally sealed to an annular wall defining at least part of said major bore so as to immovably retain said bolt in position in said bores, one of the bores being non-circular and the complementary portion of the bolt retained in said one of the bores being non-circular, whereby the bolt is non-rotatably retained in the bores, and a projection extending from the rear support housing in spaced relationship to the bolt and adapted to cooperate with a support bracket so as to prevent rotation of the reflector relative to such support bracket and orient the reflector as desired.

2. A reflector as in claim 1 wherein the neck portion of the bolt is non-circular and the minor bore is non-circular, whereby the bolt is non-rotatably retained in the bores.

3. A reflector as in claim 2 wherein the minor bore is square in cross-section and the neck portion of the bolt is square in cross-section.

4. A reflector as in claim 1 wherein the cap is ultrasonically bonded to said annular wall.

* * * * *